United States Patent
Weng et al.

(10) Patent No.: US 9,623,826 B2
(45) Date of Patent: Apr. 18, 2017

(54) VEHICLE IMPACT ENERGY ABSORBER

(71) Applicant: Ford Global Technologies, LLC, Dearborn, MI (US)

(72) Inventors: Tzu-Chen Weng, Troy, MI (US); Srinivas Reddy Malapati, Novi, MI (US); Djamal Eddine Midoun, Ann Arbor, MI (US); Sean Timothy Ryan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 14/632,016

(22) Filed: Feb. 26, 2015

(65) Prior Publication Data

US 2016/0250988 A1    Sep. 1, 2016

(51) Int. Cl.
*B60R 21/207* (2006.01)
*B60R 21/231* (2011.01)
*B60R 21/04* (2006.01)
*B60R 21/215* (2011.01)
*B60R 21/235* (2006.01)

(52) U.S. Cl.
CPC .......... *B60R 21/207* (2013.01); *B60R 21/215* (2013.01); *B60R 2021/0407* (2013.01); *B60R 2021/21512* (2013.01); *B60R 2021/23153* (2013.01); *B60R 2021/23519* (2013.01)

(58) Field of Classification Search
CPC .. B60R 2021/0407; B60R 2021/23153; B60R 21/207; B60N 2/42
See application file for complete search history.

(56) References Cited

U.S. PATENT DOCUMENTS

| | | | |
|---|---|---|---|
| 5,435,594 A * | 7/1995 | Gille | B60R 21/20 |
| | | | 280/728.2 |
| 5,704,636 A * | 1/1998 | Koide | B60R 21/217 |
| | | | 280/728.2 |
| 5,738,368 A | 4/1998 | Hammond et al. | |
| 5,782,529 A | 7/1998 | Miller, III et al. | |
| 6,557,887 B2 | 5/2003 | Wohllebe | |
| 6,688,643 B2 * | 2/2004 | Schneider | B60R 21/206 |
| | | | 280/728.3 |

(Continued)

FOREIGN PATENT DOCUMENTS

| | | | | |
|---|---|---|---|---|
| DE | 4008243 A1 * | 9/1991 | | B60R 21/207 |
| DE | 19546143 A1 * | 6/1997 | | B60R 21/20 |

(Continued)

*Primary Examiner* — Ruth Ilan
(74) *Attorney, Agent, or Firm* — Frank MacKenzie; Bejin Bieneman PLC (57) ABSTRACT

A seat includes a seat back having a frame and a cover, an impact absorbing device, and an actuator in communication with the impact absorbing device. The impact absorbing device is movable from a stowed position to a deployed position. The impact absorbing device includes a base connected to the frame, a panel adjacent to the cover in the stowed position and spaced from the cover in the deployed position, and an intermediate portion connected to the base and the panel. The intermediate portion defines a chamber between the base and the panel. The intermediate portion has a portion thickness and the panel has a panel thickness greater than the portion thickness.

20 Claims, 6 Drawing Sheets

(56) References Cited

U.S. PATENT DOCUMENTS

| | | | |
|---|---|---|---|
| 6,712,385 B2 * | 3/2004 | Enders | B60R 21/206 280/730.1 |
| 6,817,627 B2 * | 11/2004 | Galmiche | B60R 21/205 280/730.1 |
| 7,367,587 B2 * | 5/2008 | Taoka | B60R 21/045 280/728.2 |
| 8,336,910 B1 * | 12/2012 | Kalisz | B60R 13/0243 280/730.1 |
| 8,720,948 B2 * | 5/2014 | Raines | B60R 21/04 280/728.3 |
| 9,061,643 B1 * | 6/2015 | Raines | B60R 21/04 |
| 9,150,180 B1 * | 10/2015 | Faruque | B60R 21/045 |
| 9,156,408 B1 * | 10/2015 | Raines | B60R 7/06 |
| 9,174,600 B1 * | 11/2015 | Jayasuriya | B60R 21/206 |
| 2004/0007856 A1 * | 1/2004 | Enders | B60R 21/206 280/730.1 |
| 2006/0202452 A1 | 9/2006 | Breed et al. | |
| 2008/0114516 A1 * | 5/2008 | Jackson | B60R 21/0428 701/45 |
| 2011/0133435 A1 * | 6/2011 | Sadr | B60R 21/13 280/730.1 |
| 2012/0126516 A1 | 5/2012 | Choi et al. | |
| 2015/0091282 A1 * | 4/2015 | Nagasawa | B60N 2/4228 280/730.1 |

FOREIGN PATENT DOCUMENTS

| | | | | |
|---|---|---|---|---|
| GB | 1370441 A | * | 10/1974 | B60R 21/26 |
| JP | 3144134 B2 | * | 3/2001 | |
| JP | WO 2004011308 A1 | * | 2/2004 | B60R 21/231 |
| JP | 4176556 | | 8/2008 | |
| KR | 20040053990 A | * | 6/2004 | |
| KR | 20120040539 | | 4/2012 | |

\* cited by examiner

VEHICLE IMPACT ENERGY ABSORBER

BACKGROUND

An interior of a vehicle, such as automobile, typically includes energy absorbers for absorbing energy from an occupant of the vehicle during an impact of the vehicle. Energy absorbers may be passive, e.g., not activated before impact, or may be active, e.g., deployed when impact is sensed. Active energy absorbers may be in communication with an actuator and an impact sensing system. The impact sensing system may include a plurality of sensors for sensing impact and a controller in communication with the sensors and the actuator. The controller may cause the actuator to be activated when the sensors sense an impact.

Space within the interior of the vehicle is limited and, as such, it is desirable to design the energy absorber to be as small as possible. There remains an opportunity to design an active energy absorber with a reduced footprint before deployment.

DETAILED DESCRIPTION

Figure 1:
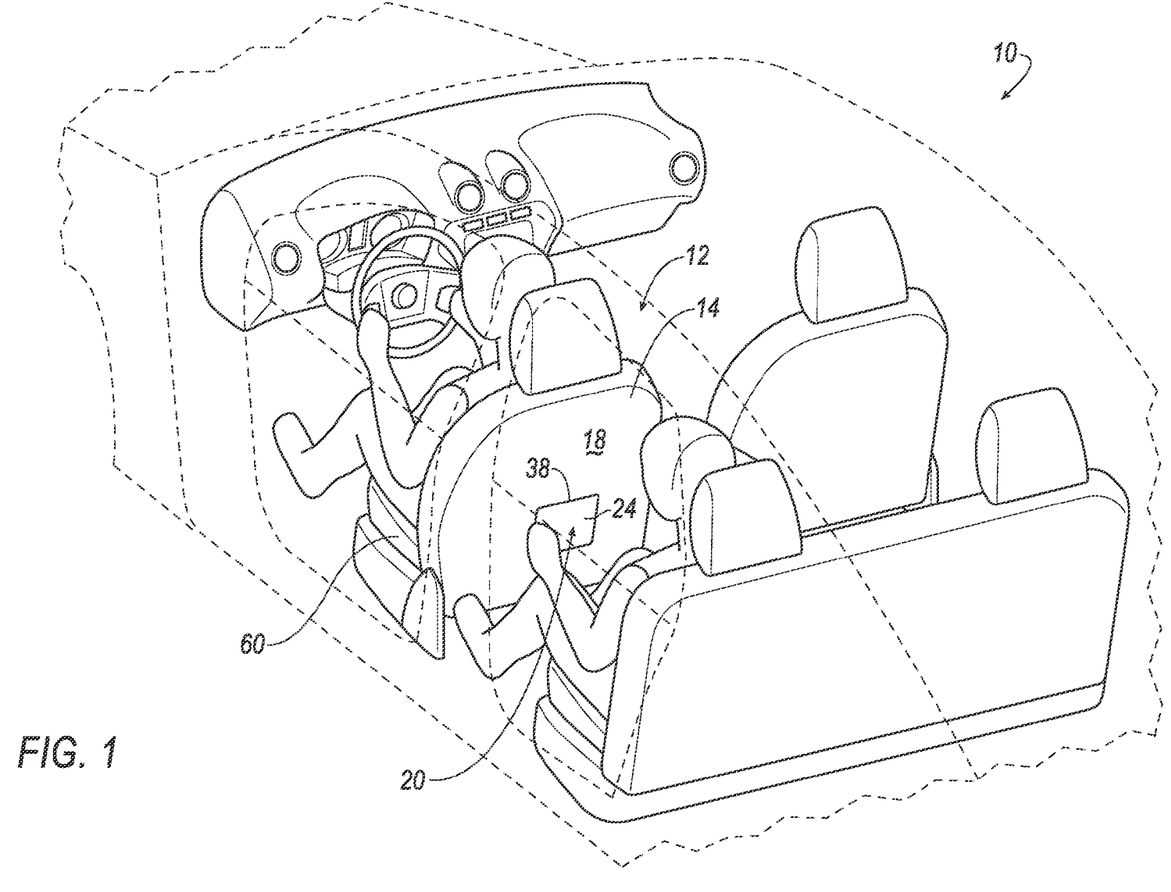
FIG. 1 is a perspective view of a vehicle seat with an impact absorbing device in a stowed position.
Figure 2:
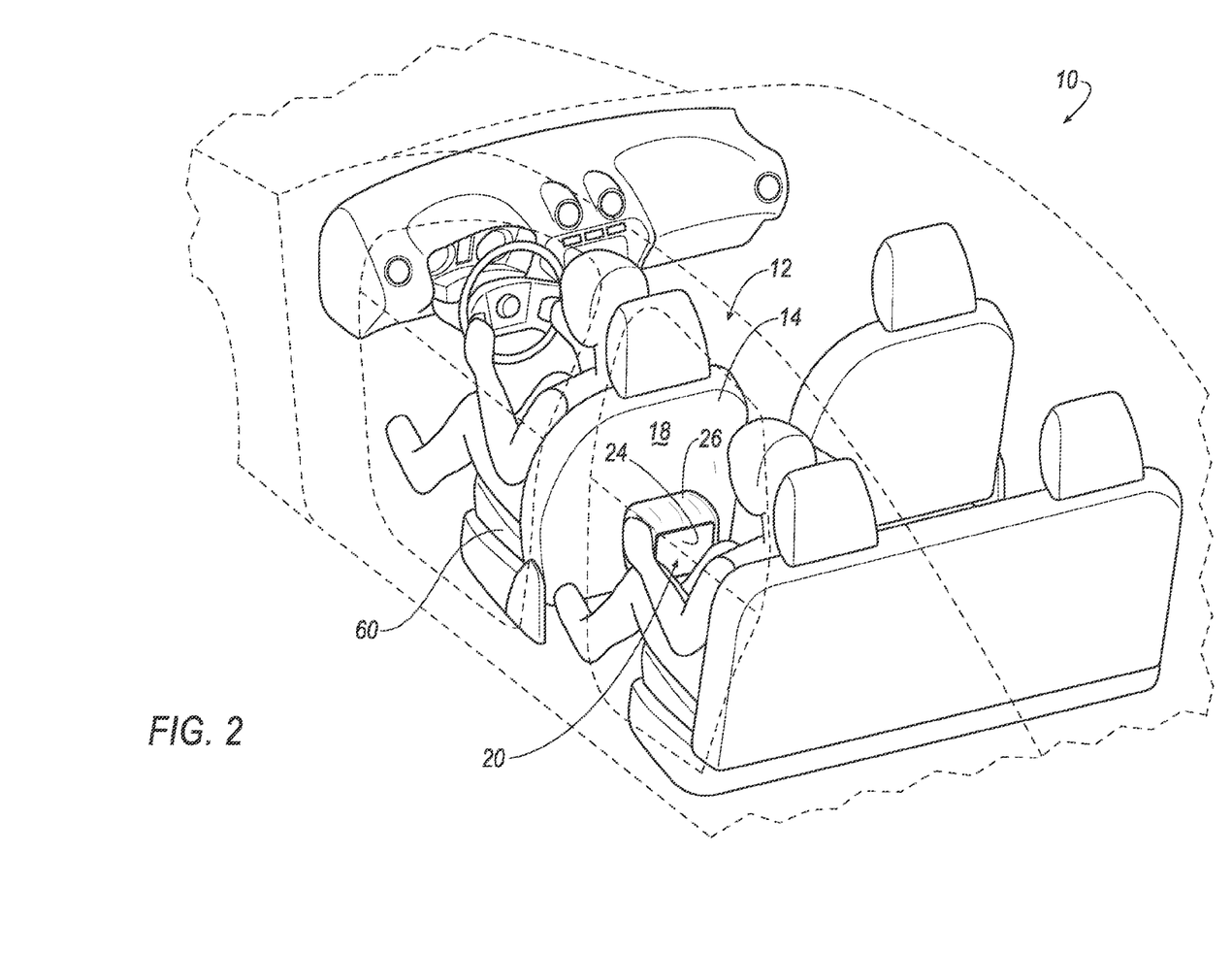
FIG. 2 is a perspective view of the vehicle seat with the impact absorbing device in a deployed position.
Figure 3:
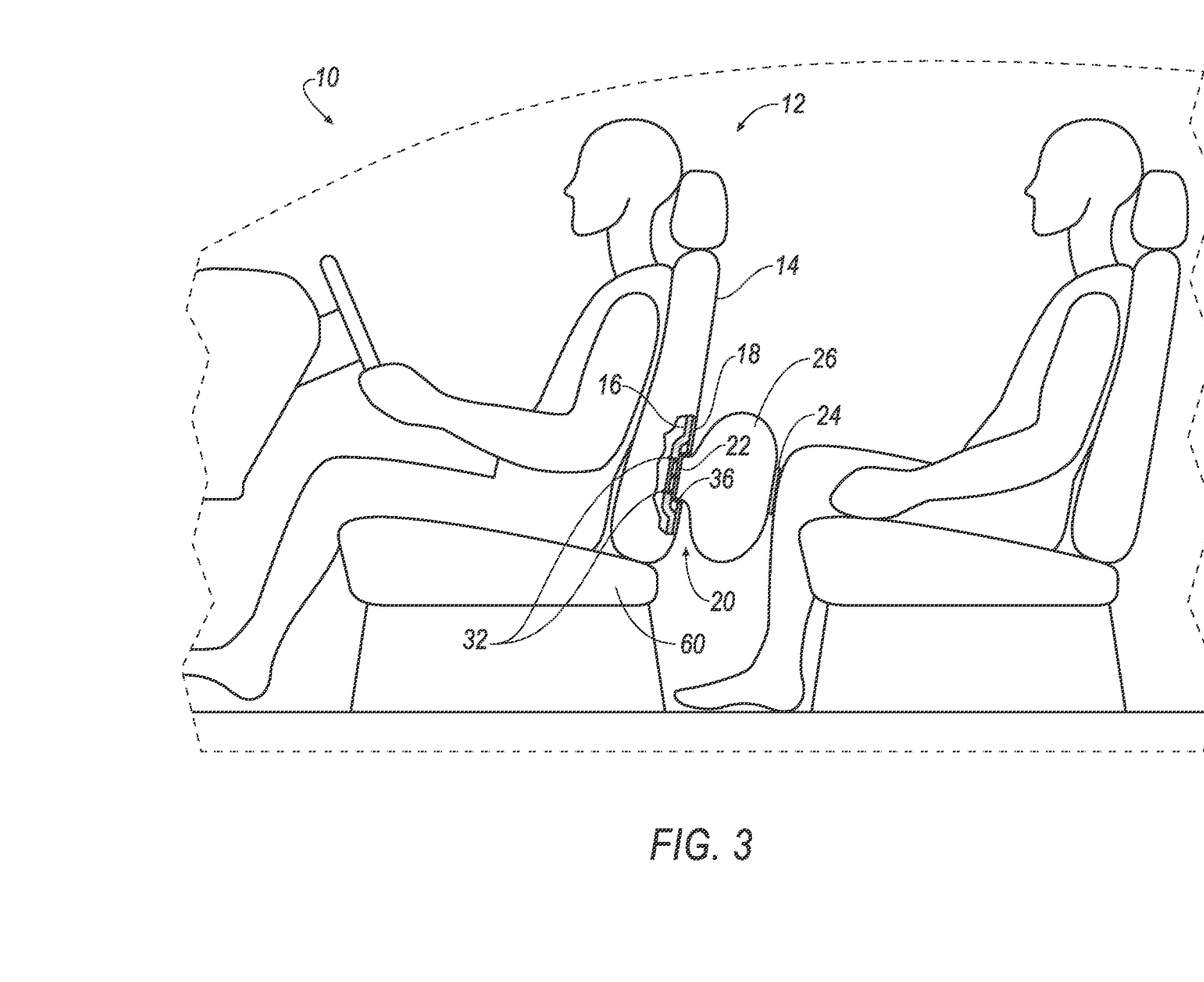
FIG. 3 is a side view of the vehicle seat with the impact absorbing device in the deployed position with chutes to facilitate deployment.
Figure 4:
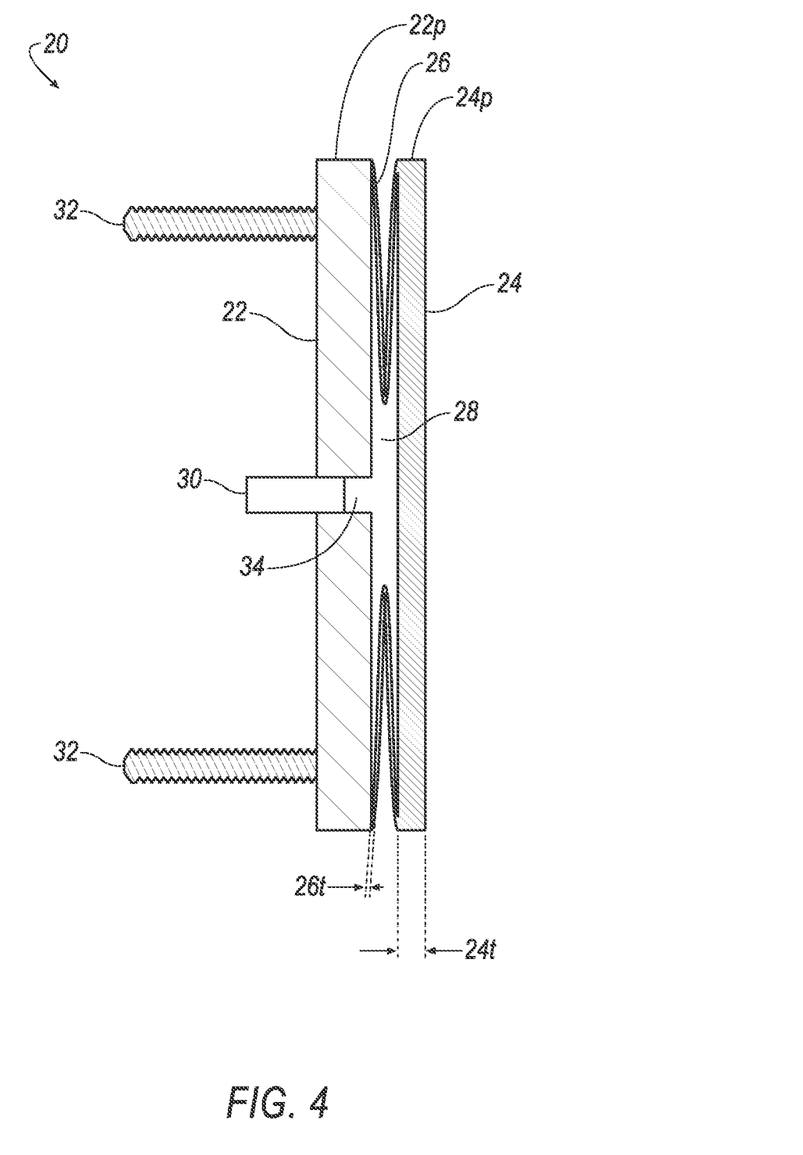
FIG. 4 is a side view of the impact absorbing device in the stowed position.

With reference to the Figures, wherein like numerals indicate like parts throughout the several views, a seat 12 in a vehicle 10 includes a seat back 14 having a frame 16 and a cover 18. The seat 12 includes an impact absorbing device 20 movable from a stowed position, as shown in FIG. 1, to a deployed position, as shown in FIGS. 2-3. The seat 12 includes an actuator 30 in communication with the impact absorbing device 20. With reference to FIGS. 3-4, the impact absorbing device 20 includes a base 22, a panel 24, and an intermediate portion 26. The base 22 is connected to the frame 16. The panel 24 is adjacent to the cover 18 in the stowed position, as shown in FIG. 1, and spaced from the cover 18 in the deployed position, as shown in FIGS. 2-3. The intermediate portion 26 is connected to the base 22 and the panel 24 and defines a chamber 28 between the base 22 and the panel 24. The panel 24 has a panel thickness 24$t$ and the intermediate portion 26 has a portion thickness 26$t$. The panel thickness 24$t$ is greater than the portion thickness 26$t$.

The thicker panel thickness 24$t$ allows the panel 24 to be exposed to an occupant, e.g., the thicker panel thickness 24$t$ can withstand normal contact and activity associated with being exposed to the passenger compartment of the vehicle 10, while the thinner portion thickness 26$t$ allows the intermediate portion 26 to be easily packaged in the seat 12 to allow for deployment. In other words, the thicker panel thickness 24$t$ increases the durability of the panel 24 and the thinner portion thickness 26$t$ reduces packaging constraints. Furthermore, the thinner portion thickness 26$t$ allows the intermediate portion 26 to deploy much more rapidly than the panel 24, increasing a surface to absorb impact energy. The portion thickness 26$t$ also reduces visible fold lines and stress concentrations, increasing the durability of the impact absorbing device 20.

The seat 12 may include a seat bottom 60 extending transverse to the seat back 14. The seat bottom 60 may be fixed to the vehicle 10 and support the occupant from underneath, while the occupant leans back onto the seat back 14.

As shown in FIG. 1, the cover 18 faces the occupant and may present a class-A surface, i.e., a surface specifically manufactured to have a high quality, finished aesthetic appearance free of blemishes. The cover 18 may be constructed of any suitable material, e.g., fabric, leather, polymer, or fabric-polymer hybrid, etc. The cover 18 may be constructed to be aesthetically pleasing.

The cover 18 may define an opening 38. The opening 38 may receive the impact absorbing device 20. In the stowed position, the panel 24 may cover the opening 38. The opening 38 allows for ease of installation of the impact absorbing device 20 into the seat 12. The base 22 connects the impact absorbing device 20 to the frame 16. As shown in FIGS. 3-4, the base 22 may, e.g., include at least one fastener 32. The fastener 32 may be of any suitable type, including a threaded fastener, a press-fit dowel, a Christmas tree fastener, etc. The threaded fastener 32 may extend through the frame 16 and may be retained to the frame 16 with threaded nuts (not shown). Alternatively, the base 22 may be connected to the frame 16 in any suitable manner.

As shown in FIGS. 1 and 2, the panel 24 faces the occupant when the impact absorbing device 20 is in the stowed position, and may present a class-A surface. The panel 24 is projected into the vehicle 10 when the impact absorbing device 20 moves to the deployed position, as shown in FIG. 2.

The panel 24 in the stowed position may be substantially flush with the seat back 14, e.g., aligned along the edges of the opening 38 without indentation. Specifically, the panel 24 of the impact absorbing device 20 may be substantially flush with the cover 18 of the seat back 14 in the stowed position.

The cover 18 may be rigid relative to the intermediate portion 26. In other words, the intermediate portion 26 may be flexible relative to the cover 18. This relative rigidity of the cover 18 increases the durability of the cover 18, which is exposed to the passenger compartment of the vehicle 10.

The intermediate portion 26 connects the base 22 to the panel 24, as shown in FIGS. 3-4. The intermediate portion 26 allows the panel 24 to move toward a passenger seated in a back seat of the vehicle 10 upon deployment of the impact absorbing device 20 from the stowed position to the deployed position, as shown in FIGS. 2-3. The intermediate portion 26 may be formed of any suitable material. In the stowed position, the intermediate portion 26 may be folded between the base 22 and the panel 24. Upon deployment from the stowed position to the deployed position, the intermediate portion may unfold to allow movement of the panel 24. During deployment, the intermediate portion 26 may expand, i.e., stretch. Alternatively, the intermediate portion 26 may deploy without expanding.

The panel 24 and the intermediate portion 26 may be integral, i.e., formed simultaneously as a unitary construction. A unitary construction allows for a more efficient manufacturing process and fewer stress concentration points. In alterative to being integral, the panel 24, and the intermediate portion 26 may be formed separately and later joined by any suitable method, e.g., fusing, fastening, and/or adhesives. In addition, the base 22 may be integral with the panel 24 and the intermediate portion 26, i.e., formed simultaneously as a unitary construction.

The panel 24 and the intermediate portion 26 may be formed of the same type of material. For example, the panel 24 and the intermediate portion 26 may be formed of vinyl, rubber, plastic, etc. Forming the impact absorbing device 20 from the same type of material allows for easier manufacturing and reduced weight and cost. Using the same type of material also aids in joining the parts of the impact absorbing device 20 together during manufacturing. For proper inflation and packaging, the panel 24 may be spaced from the base 22 in the stowed position. Spacing the panel 24 from the base 22 allows the intermediate portion 26 to be folded between the panel 24 and the base 22 in the stowed position decreasing the total amount of space needed for the impact absorbing device 20. The spacing also allows the panel 24 to move during deployment, unlike the base 22 which remains stationary.

The intermediate portion 26 defines the chamber 28 between the base 22 and the panel 24. The size of the chamber 28 can vary, as a design factor, depending on how the intermediate portion 26 connects the base 22 and the panel 24. The designed size of the chamber 28, which may be varied, may affect the inflation speed during deployment.

The base 22 may have a base periphery 22p, and the panel 24 may have a panel periphery 24p, as identified in FIG. 4. The intermediate portion 26 may extend from the base periphery 22p to the panel periphery 24p and may be connected to the base 22 at the base periphery 22p and to the panel 24 at the panel periphery 24p. Connecting the base periphery 22p to the panel periphery 24p also eases manufacturing while allowing more of the intermediate portion 26 to be folded between the panel 24 and the base 22.

The actuator 30 may be in communication with the chamber 28. For example, the actuator 30 may be in communication with the chamber 28 through a port 34 in communication with the chamber 28. The port 34 may, for example, communicate actuation medium from the actuator 30 to the chamber 28 to transition the impact absorbing device 20 from the stowed position to the deployed position. In such a configuration, the chamber 28 may be referred to as an inflation chamber. The port 34 may extend through the base 22, or may communicate with the chamber 28 in any suitable location.

The actuator 30 may be a pyrotechnic inflator. Upon impact, the actuator 30 may inflate the impact absorbing device 20 with actuation medium through the port 34. The actuator 30 may be positioned within the port 34 or may communicate with the chamber 28 through another part of the impact absorbing device 20. Alternatively, the actuator 30 may be of any suitable type, e.g., mechanically, hydraulically, or pneumatically actuated.

The actuator 30 and the impact absorbing device 20 may be assembled together as an impact absorbing module, as shown in FIG. 4. In other words, the impact absorbing module is a single unit that may be assembled as one assembled piece to the seat back 14.

To facilitate smooth deployment of the intermediate portion 26, the seat 12 may include a chute 36, as shown in FIG. 3. The chute 36 may be disposed between the panel 24 and the cover 18, extending around the panel periphery 24p in the stowed position. The chute 36 may be constructed of any suitable material, such as plastic. The chute 34 directs the intermediate portion 26 from the seat back 14 more quickly, reducing the amount of time until the impact surface is created. The chute 36 may be a unitary construction or segmented to interact with different parts of the intermediate portion 26.

Figure 5A:
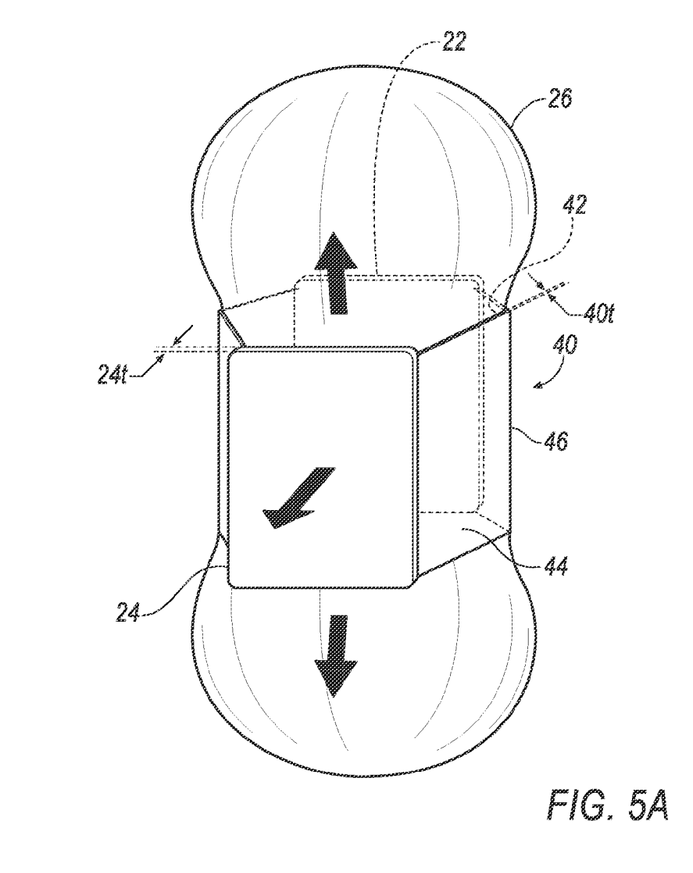
FIG. 5A is a front view of one configuration of a second embodiment of the impact absorbing device in the deployed position having side panels that point outward.
Figure 5B:
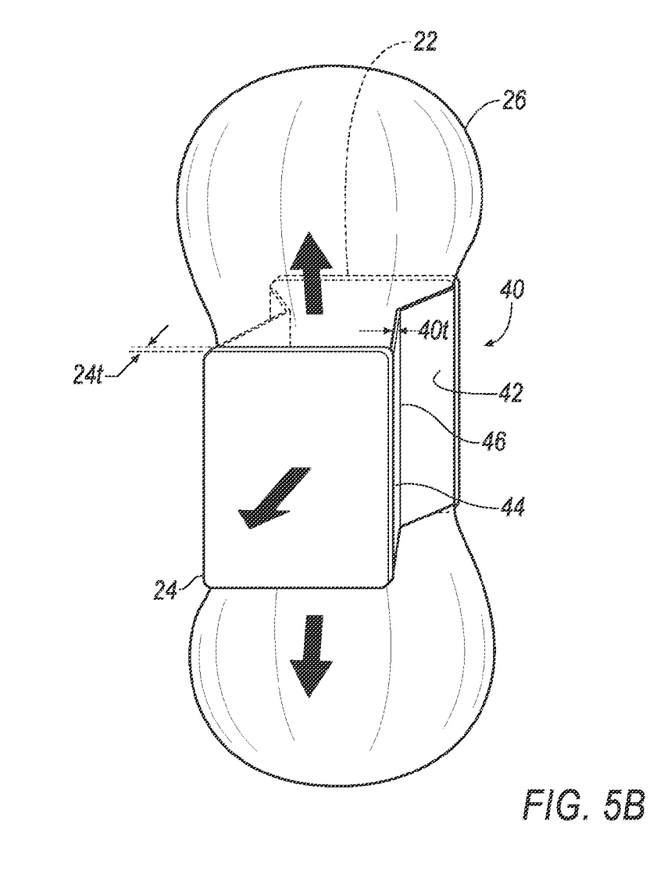
FIG. 5B is a front view of another configuration of the second embodiment of the impact absorbing device in the deployed position where the side panels point inward.

In a second embodiment shown in FIGS. 5A and 5B, the impact absorbing device 20 has at least one side panel 40 connected to the intermediate portion 26, the base 22, and the panel 24. The side panel 40 has a side panel thickness 40t greater than the portion thickness 26t. The side panel 40 may retain its shape as the impact absorbing device 20 moves to the deployed position, i.e., does not stretch, further allowing for controlled expansion of the impact absorbing device 20.

With continued reference to FIGS. 5A and 5B, the side panel 40 may include a first portion 42 connected to the base 22, a second portion 44 connected to the panel 24, and a crease 46 between the first portion 42 and the second portion 44. The side panel 40 may be folded between the base 22 and the panel 24. As the impact absorbing device 20 moves to the deployed position, the crease 46 may unfold to point outwardly away from the impact absorbing device 20, as in FIG. 5A, or may remain between the base 22 and the panel 24, as in FIG. 5B. The impact absorbing device 20 may include any suitable number of side panels 40 facing any suitable direction depending on the desired inflation characteristics of the impact absorbing device 20. The side panel 40 may have multiple creases 46.

Figure 6:
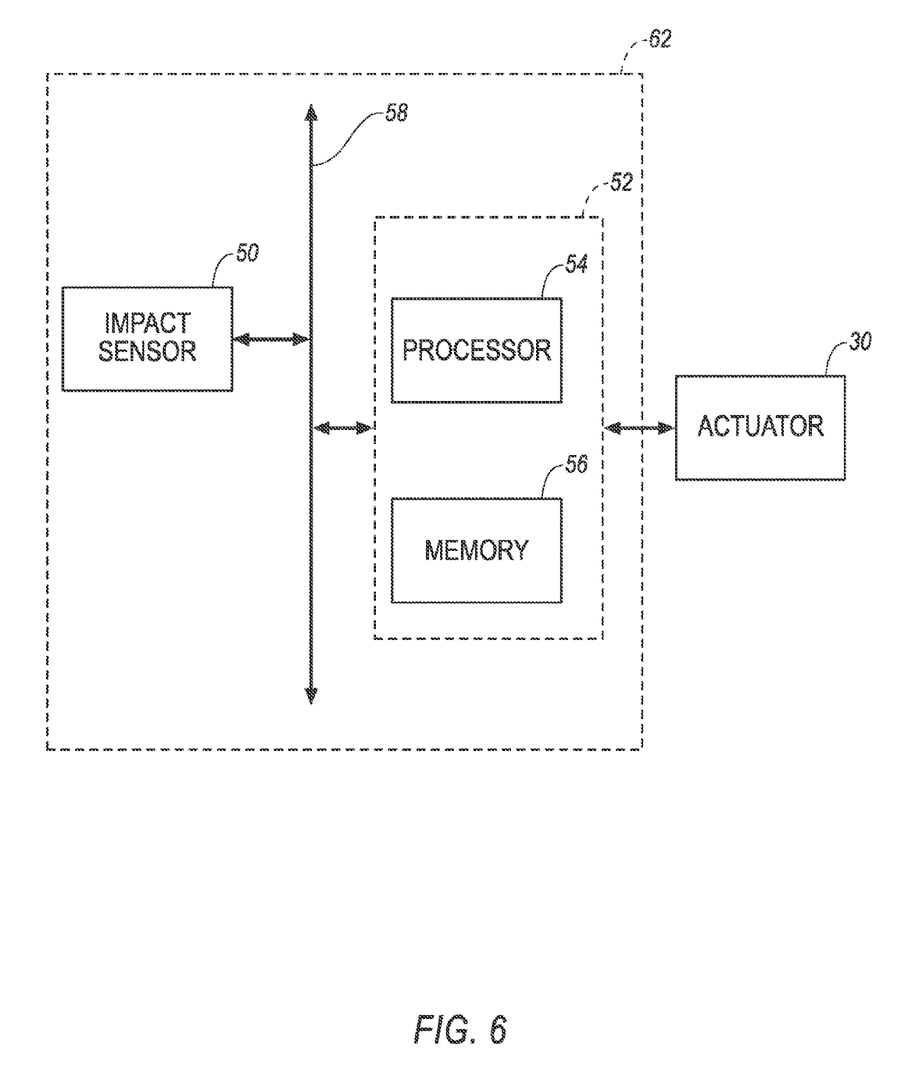
FIG. 6 is a block diagram of an actuator and an impact sensing system.

With reference to FIG. 6, the vehicle 10 may include an impact sensing system 62. The impact sensing system 62 may include an impact sensor 50 and a controller 52. The controller 52 is in communication with the actuator 30 and may include a processor 54 and a memory 56, as shown in FIG. 6. The memory 56 stores instructions executable by the processor 54 to control the actuator 30. The controller 52 may be programmed to, upon identification of an impact, cause triggering of the actuator 30, moving the impact absorbing device 20 from the stowed position to the deployed position.

The impact sensor 50 may be in communication with the controller 52 to communicate data to the controller 52. The impact sensor 50 may be of any suitable type, e.g., using accelerometers, radar, lidar, and/or a vision system. The vision system may include one or more cameras, CCD image sensors, and/or CMOS image sensors, etc. Based on data communicated by the impact sensor 50, the controller 52 may cause triggering the actuator 30.

Communications between the controller 52, the impact sensor 50, the actuator 30, and or other components in the vehicle 10, may be connected to a communication bus 58, such as a controller area network (CAN) bus, of the vehicle 10. The controller 52 may use information from the communication bus 58 to control the triggering of the actuator 30. The actuator 30 may be connected to the controller 52 or may be connected to the communication bus 58.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A seat comprising:
a seat back having a frame and a cover;

an impact absorbing device inflatable from a stowed position to a deployed position, the impact absorbing device including a base connected to the frame, a panel adjacent to the cover in the stowed position and spaced from the cover in the deployed position, and an intermediate portion connected to the base and the panel, the intermediate portion defining an inflation chamber between the base and the panel;

the intermediate portion having a portion thickness and the panel having a panel thickness greater than the portion thickness;

a chute disposed between the panel and the cover for directing the intermediate portion from the seat back; and an inflator in fluid communication with the inflation chamber.

2. The seat of claim 1, wherein the panel and the intermediate portion are integral.

3. The seat of claim 1, wherein the panel and the intermediate portion are formed of the same type of material.

4. The seat of claim 1, wherein the panel is substantially flush with the cover in the stowed position.

5. The seat of claim 1, wherein the panel has a panel periphery and the intermediate portion is connected to the panel periphery.

6. The seat of claim 5, wherein the base has a base periphery and wherein the intermediate portion extends from the base periphery to the panel periphery.

7. The seat of claim 1, wherein the intermediate portion is folded between the base and the panel in the stowed position.

8. The seat of claim 1, further comprising a seat bottom extending transverse to the seat back.

9. The seat of claim 1, further comprising at least one side panel connected to the intermediate portion between the base and the panel.

10. The seat of claim 1, wherein the panel presents a class-A surface.

11. The seat of claim 1, wherein the cover defines an opening receiving the impact absorbing device.

12. The seat of claim 11, wherein the panel covers the opening in the stowed position.

13. A seat comprising:
a seat back having a frame and a cover;
an impact absorbing device movable from a stowed position to a deployed position, the impact absorbing device including a base connected to the frame, a panel adjacent to the cover in the stowed position and spaced from the cover in the deployed position, and an intermediate portion connected to the base and the panel, the intermediate portion defining a chamber between the base and the panel;

the intermediate portion having a portion thickness and the panel having a panel thickness greater than the portion thickness;

a chute disposed between the panel and the cover for directing the intermediate portion from the seat back; and an actuator in communication with the impact absorbing device.

14. The seat of claim 13, wherein the panel and the intermediate portion are integral.

15. The seat of claim 13, wherein the panel is substantially flush with the cover in the stowed position.

16. The seat of claim 13, wherein the actuator is an inflator in fluid communication with the chamber.

17. A seat comprising:
a seat back having a frame and a cover;
an impact absorbing device inflatable from a stowed position to a deployed position, the impact absorbing device including a base connected to the frame, a panel adjacent to the cover in the stowed position and spaced from the cover in the deployed position, and an intermediate portion connected to the base and the panel, the intermediate portion defining an inflation chamber between the base and the panel;

the intermediate portion having a portion thickness and the panel having a panel thickness greater than the portion thickness;

at least one side panel connected to the intermediate portion between the base and the panel; and an inflator in fluid communication with the inflation chamber.

18. The seat of claim 17, wherein the side panel includes a first portion connected to the base, a second portion connected to the panel, and at least one crease between the first portion and the second portion.

19. The seat of claim 17, wherein the side panel is folded between the panel and the base in the stowed position.

20. The seat of claim 17, wherein the side panel has a side panel thickness greater than the portion thickness.

* * * * *